3-11-75 XR 3,870,816 SR

United States Patent [19]
Mason

[11] 3,870,816
[45] Mar. 11, 1975

[54] OPTICAL SYSTEM FOR TRANSMIT/RECEIVE MODE CONDITIONING OF FACSIMILE TRANSCEIVERS

[75] Inventor: Peter John Mason, Ontario, N.Y.

[73] Assignee: Xerox Corporation, Stamford, Conn.

[22] Filed: May 17, 1973

[21] Appl. No.: 361,388

[52] U.S. Cl. .................. 178/7.6, 350/266
[51] Int. Cl. .................. H04n 1/42
[58] Field of Search .................. 178/7.6, 6, 6.7 R, 6.7 A; 350/266, 273, 6; 346/74 ES, 76 L

[56] References Cited

UNITED STATES PATENTS

| | | | |
|---|---|---|---|
| 3,287,736 | 11/1966 | Germer | 178/7.6 |
| 3,316,348 | 4/1967 | Hufnagel | 178/7.6 |
| 3,750,189 | 7/1973 | Fleischer | 346/74 ES |

OTHER PUBLICATIONS

IBM Technical Disclosure Bulletin, Vol. 15, No. 10, March 1973, "Triple Function Box," R. A. Thorpe, pp. 3259–3260.

IBM Technical Disclosure Bulletin, Vol. 15, No. 12, May 1973, "Varied Spot Geometry for Laser Scanner and Printer," J. G. Gordan, p. 3864.

*Primary Examiner*—Robert L. Griffin
*Assistant Examiner*—Michael A. Masinick

[57] ABSTRACT

A facsimile transceiver having a laser for emitting a beam of collimated light and a rotatably driven scanning mirror for cyclically sweeping the light beam through a predetermined planar scan angle is selectively conditioned for operation in a transmit mode or a receive mode by an optical system including a motor driven cam mechanism for selectively moving a flip mirror into and out of the optical path for the light beam reflected from the scanning mirror, thereby causing the cyclically sweeping light beam to be directed toward either a line-like scanning station or a line-like printing station.

9 Claims, 7 Drawing Figures

OPTICAL SYSTEM FOR TRANSMIT/RECEIVE MODE CONDITIONING OF FACSIMILE TRANSCEIVERS

BACKGROUND OF THE INVENTION

This invention relates, generally, to optical systems and, more particularly, to optical systems for facsimile transceivers relying on laser scanning and laser printing.

Extensive time and effort has been devoted to applying lasers to facsimile scanning and printing. It has been found that the characteristic collimation of the light beam emitted by the laser permits spot projection scanning techniques to be utilized, while avoiding the complexity of having mechanical apertures or the like to limit the size of the scanning spot. Additionally, methods and means have been developed for modulating the intensity of the light beam emitted by the laser in accordance with a video signal, with the result that the laser is also suitable for facsimile printing. The recording medium for laser printing may, of course, be either an intermediate medium, such as a xerographic drum, or a more permanent image record, such as a photosensitive or thermally sensitive paper or film.

The advantages of facsimile terminals which are selectively operable in either a transmit mode or a receive mode are well recognized, and the modern trend in the facsimile art is, therefore, toward transceiver-type equipment. There are, however, special problems associated with the application of the laser to facsimile transceivers, including the physical bulk and the present day expense of the laser per se and of the optics required for laser scanning and laser printing.

SUMMARY OF THE INVENTION

One of the broader aims of the present invention is to provide an optical system for selectively directing a collimated light beam to either one of a pair of spaced apart stations as the beam is being swept through a predetermined angle and without materially altering the length of the optical path for the light beam.

On a more concrete level, a general object of this invention is to provide an optical system for selectively conditioning a facsimile transceiver for laser scanning or laser printing, while utilizing the same laser and the same deflecting mechanism for the scanning and the printing.

Even more particularly, an object of the present invention is to provide an optical system for selectively directing a laser light beam to either the scanning station or the printing station of a facsimile transceiver as the light beam is being cyclically swept through a predetermined planar scan angle and without materially altering the length of the optical path for the light beam. A specific related object is to provide an optical system of the foregoing type which is additionally characterized by a high degree of repeatability so that the cyclically sweeping light beam is selectively directed to the scanning station in one predetermined plane or to the printing station in another predetermined plane. Another detailed related object is to provide an optical system of the foregoing type for selectively focusing a cyclically sweeping laser light beam on either a line-like scanning station or a line-like printing station of a facsimile transceiver.

To carry out these and other objects of the present invention, the optical system is combined with a facsimile transceiver having a laser for emitting a beam of collimated light and a rotatably driven scanning mirror for reflectively sweeping the light beam through a predetermined planar scan angle. The illustrated optical system comprises a flat mirror and a motor into and out of the optical path for the light beam reflected from the scanning mirror. Provision is made for precisely and repeatedly locating the flat mirror as it is inserted into the optical path so that the cyclically sweeping light beam is selectively directed in one predetermined plane toward the scanning station of the transceiver or in another predetermined plan toward its printing station via respective optical paths of substantially equal length.

BRIEF DESCRIPTION OF THE DRAWINGS

Still further objects and advantages of this invention will become apparent when the following detailed description is read in conjunction with the attached drawings, in which.

DETAILED DESCRIPTION OF THE ILLUSTRATED EMBODIMENT

While the invention is described hereinafter in some detail with reference to a single illustrated embodiment, it will be understood that there is no intent to limit it to that embodiment. On the contrary, the intent is to cover all modification, alternatives and equivalents following within the spirit and scope of the invention as defined by the appended claims.

Figure 1:
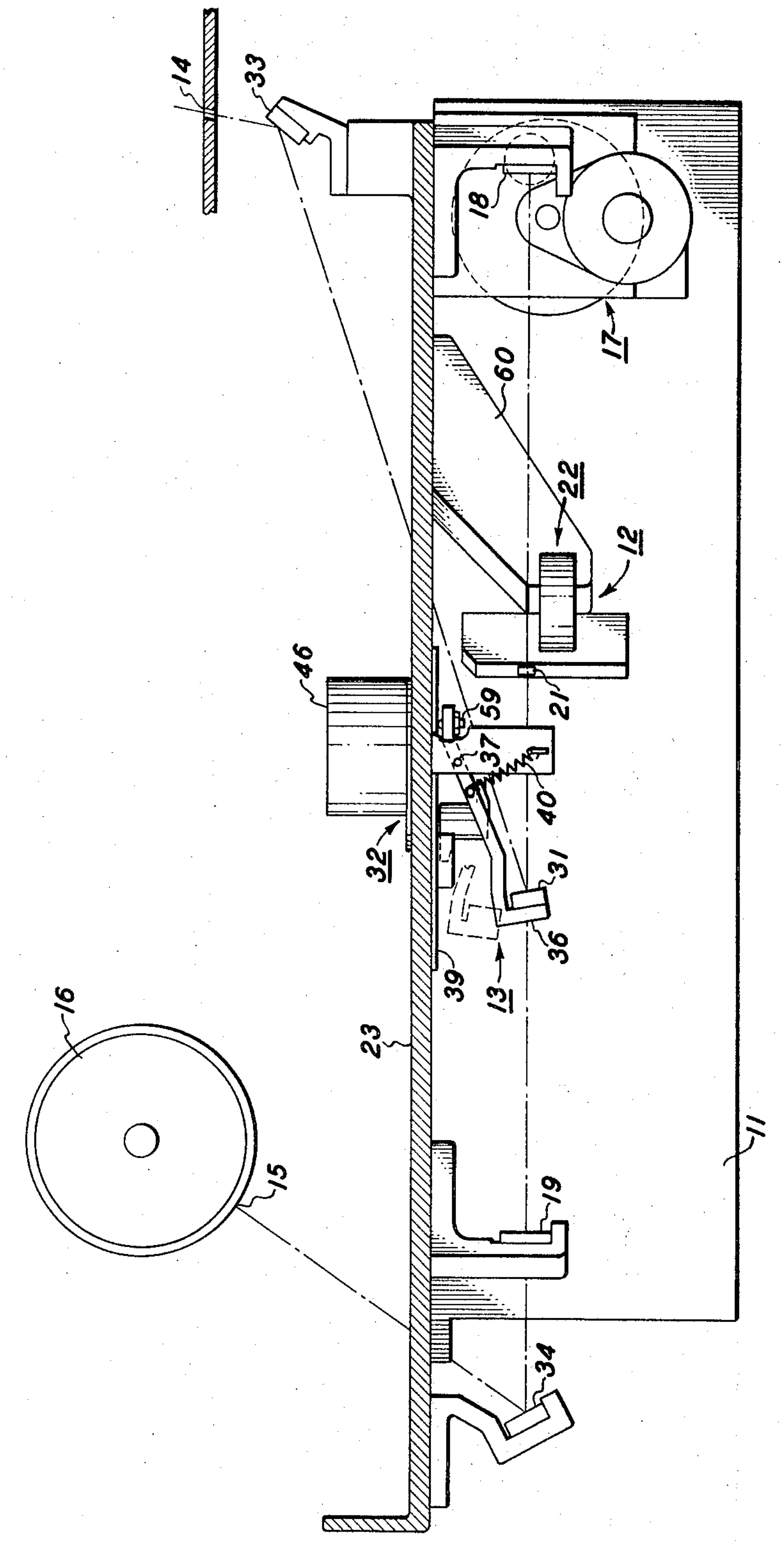
FIG. 1 is a simplified, fragmentary, elevational view of a facsimile transceiver including an optical system constructed in accordance with this invention.
Figure 2:
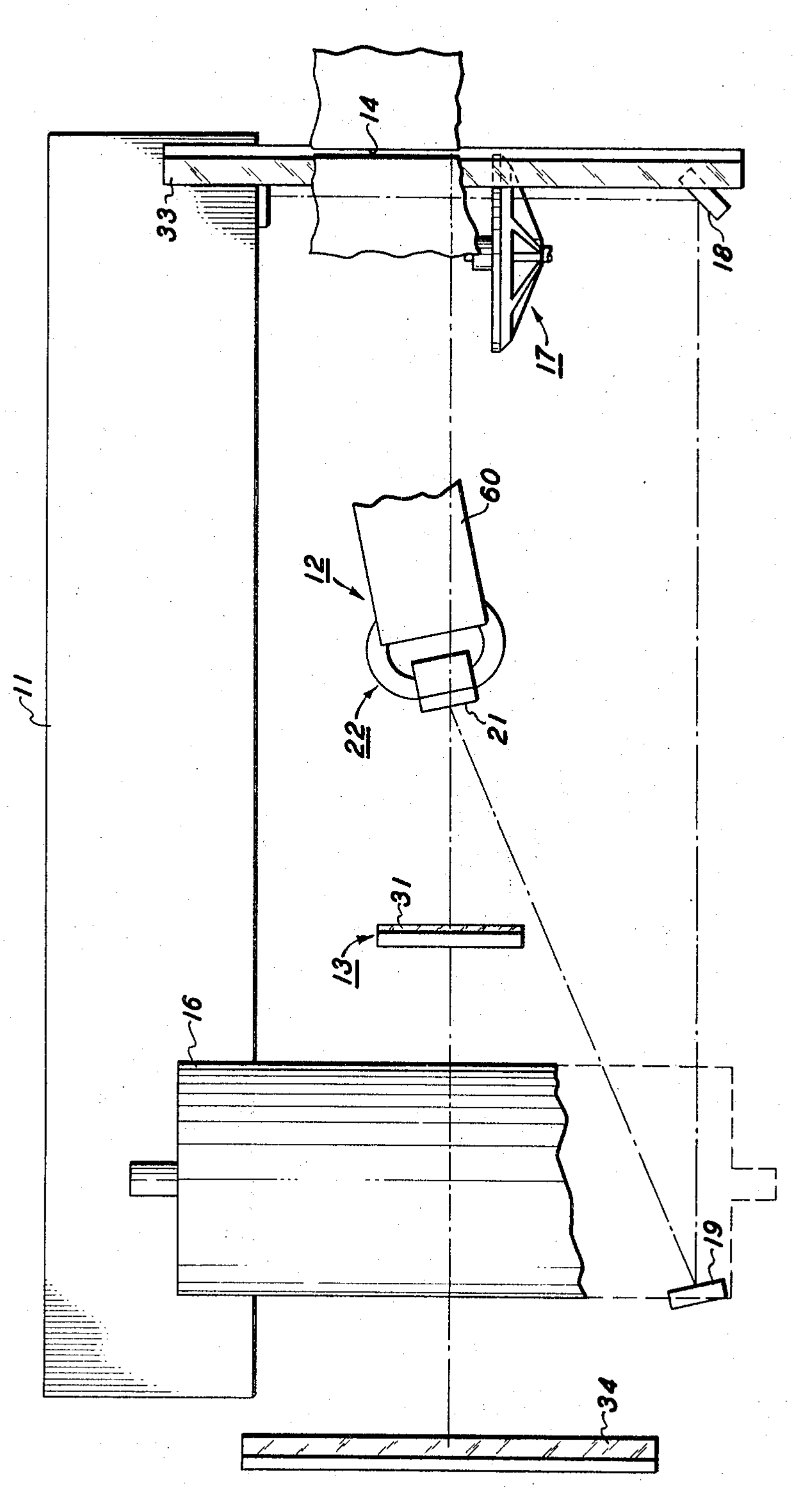
FIG. 2 is a simplified top view of the facsimile transceiver shown in FIG. 1.

Turning now to the drawings, and at this point especially to FIGS. 1 and 2, it will be seen that the facsimile transceiver there shown relies on laser scanning when operating in its transmit mode and on laser printing when operating in its receive mode. To that end, the transceiver includes a laser 11 for supplying a coherent and substantially collimated beam of light, a deflecting mechanism 12 for cyclically sweeping the light beam through a predetermined scan angle $\theta$, and an optical system 13 for selectively directing the cyclically sweeping light beam toward a line-like scanning station 14 or a line-like printing station 15. As will be appreciated, the optical system 13 (which may conveniently be referred to as a flip mirror assembly) provides a synergistic effect inasmuch as it permits the same laser 11 and the same deflecting mechanism 12 to be employed for scanning and printing, thereby maintaining the expense and physical dimensions of the transceiver within reasonable limits.

The scanning and printing stations 14 and 15 are spaced apart to accommodate their diverse requirements. For example, the scanning involves the projection of a substantially constant intensity spot of scanning light onto the information bearing surface of a subject copy (not shown) which, in turn, is typically incrementally advanced (by means not shown) in the plane of and perpendicularly to the scanning station 14 when the transceiver is operating in its transmit mode. The printing, on the other hand, characteristically involves the projection of an intensity modulated spot of scanning light onto the photoconductively coated surface of a xerographic drum 16. Suitably, the drum 16 is mounted for rotation about an axis which is substantially parallel to the printing station 15 and offset therefrom by a distance substantially equal to the drum radius, and means (not shown) are provided for stepping the drum 16 about its axis of rotation when the transceiver is operating in its receive mode so that its photoconductively coated surface is then incrementally advanced past the printing station 15.

Various modifications may, of course, be made to the optical path between the laser 11 and the flip mirror assembly 13 without departing from this invention. In the illustrated embodiment, the collimated light beam emitted by the laser 11 passes through a filtering mechanism 17 and then bounces off successive fixed mirrors 18 and 19 while in route to the deflecting mechanism 12. For present purposes, it suffices to merely note that the filtering mechanism 17 is an adjustable attenuator which may be preset to maintain the intensity of the light beam within any one of several predetermined ranges so that the printing may be carried out at any one of several different rates. Also, it should be observed that the deflecting mechanism 12 is a rotating mirror-type scanner. Specifically, as shown, the deflecting mechanism 12 comprises a flat scanning mirror 21 and a galvanometer type driver 22. The mirror 21 is disposed in the optical path for the light beam and is periodically oscillated through the angle $\theta$ about a substantially vertical axis by the driver 22. Hence, the light beam reflected from the scanning mirror 21 is cyclically swept through the desired angle $\theta$ in, say, a substantially horizontal plane. As will be seen, the mirror 21 and the driver 22 are supported by a bracket 60. The laser 11, the filter mechanism 17, the mirrors 18 and 19, and the bracket 60 are all suitably supported by a main base frame member 23.

In many instances it is also desirable to include a lens (not shown) between the laser 11 and the deflecting mechanism 12 for convergently focusing the beam while modifying its cross-section configuration. For example, an anamorphic lens has been employed in experimental models of the transceiver shown to provide an elliptical scanning/printing spot having a major axis of approximately 0.020 inches and a minor axis of approximately 0.010 inches focused so that the locus of the focus is equidistant from the ends and the center of the scanning station when the transceiver is in its transmitting mode and of the printing station when the transceiver is in its printing mode. As will be appreciated, the size of the scanning spot defines the effective scanning aperture, while the size of the printing spot defines the effective printing aperture.

To enable the same laser 11 and beam deflecting mechanism 12 to be used for scanning and printing in accordance with this invention, the flip mirror assembly 13 comprises an elongated, flat mirror 31 and a motor driven cam mechanism 32 for selectively moving the mirror 31 into and out of the optical path for the light beam reflected from the scanning mirror 21. As shown in FIG. 1, the mirror 31 is stationed in an upper phantom line position or a lower solid line position. When the mirror 31 is in its lower position, it intercepts and reflectively redirects the cyclically sweeping light beam to the scanning station 14 via a fixed, elongated mirror 33. Contrariwise, when the mirror 31 is in its upper position, the cyclically sweeping beam passes therebelow and continues in its original plane until it impinges on another fixed elongated mirror 34 which then reflects the beam to the printing station 15. Optical distortion of the cyclically sweeping light beam is minimized by maintaining the mirrors 31, 33 and 34 in parallel alignment with each other and with the scanning and printing stations 14 and 15. Importantly, the optical path length for the cyclically sweeping light beam is substantially independent of the position in which the mirror 31 is stationed. Specifically, when the mirror 31 is in its lower position, it is intersected by a bisector of the scan angle $\theta$ at a point that is substantially optically equidistant from the scanning station 14 and the printing station 15. The result is that the scanning and printing spots projected to the scanning and printing stations 14 and 15 are of substantially identical sizes and are swept across scan lines of substantially equal length. As will be appreciated, the lengths of the mirrors 31, 33 and 34 are selected to accommodate the scan angle $\theta$ which, in turn, is selected to provide scanning and printing scan lines of a predetermined length.

Referring additionally to FIGS. 3–6, and concentrating on the details of the flip mirror assembly 13, it will be seen that the mirror 31 is supported by a generally L-shaped arm 36 which is pivotally mounted at 37 and 38 on a generally U-shaped bracket 39. The bracket 39 is secured to the main frame member 23, and tension springs 40 and 41 (only one can be seen) are connected between the arm 36 and the bracket 39 to bias the mirror 31 toward its lower position.

To selectively move the mirror 31 between its upper and lower position, there is 42 cam 41 extending through an aperture in the arm 36. The cam 42 is pinned on a shaft 44 which is coupled through suitable speed reduction gearing 45 to be given by a motor 46. The bias supplied by the springs 40, 41 urges the arm 36 toward an underlying finger-like projection or lifter 47 carried by the outer end of the cam 42. As will be appreciated, approximately one half of a revolution of the shaft 44 is sufficient to move the mirror 31 from its upper position to its lower position. Thus, there are limit switches 51 and 52 supported by the bracket 39 and mounted so that their respective actuators 53 and 54 are on diametrically opposite sides of the shaft 44. Further, the cam 42 has a profiled surface 55 which is in radial alignment with the switch actuators 53 and 54, and which is characterized by inducing an enlarged radius segment 56 having an arcuate span of somewhat less than 180°. The radius of the segment 56 is larger than any of the other radii of the profiled surface 55 and is selected to substantially match the offset between the axis of the shaft 44 and the switch actuators 53 and 54.

Figure 4:
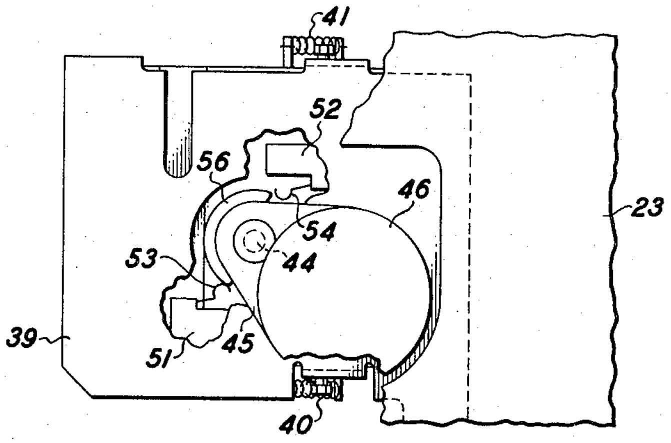
FIG. 4 is an enlarged top view of the flip mirror assembly in which certain parts have been broken away for clarity.
Figure 3:
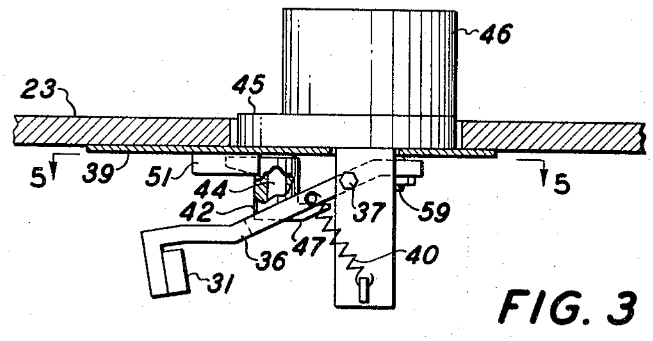
FIG. 3 is an enlarged elevational view of the flip mirror assembly shown in FIG. 1.
Figure 5:
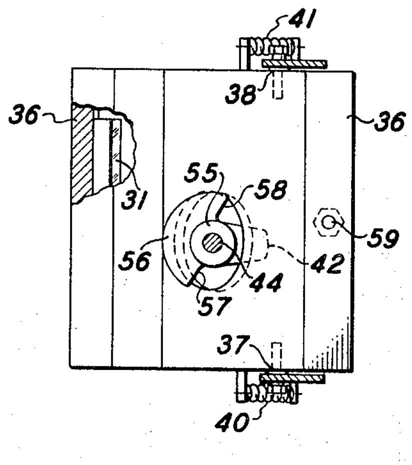
FIG. 5 is a cut away view of the flip mirror assembly taken along the line 5—5 in FIG. 3.
Figure 6:
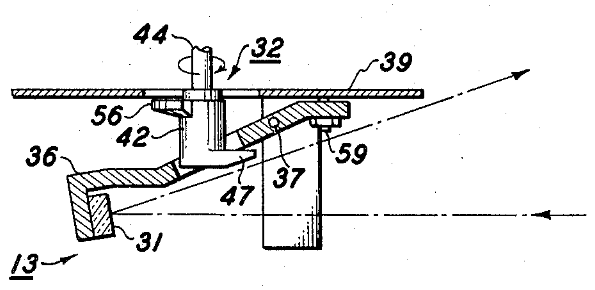
FIGS. 6 and 7 are simplified stop motion elevation views of the flip mirror assembly as positioned to intercept and pass, respectively, the scanning light beam.
Figure 7:
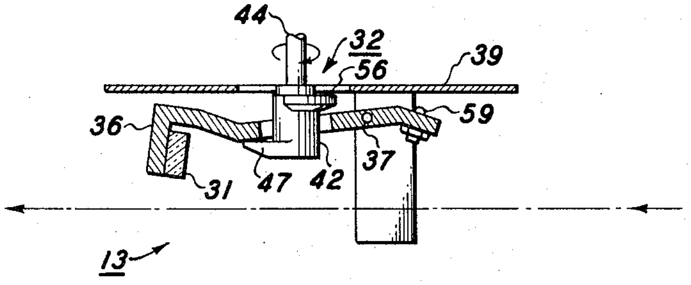

More particularly, in the illustrated embodiment, the switches 51 and 52 are normally closed types to complement the aforementioned configuration of the profiled surface 55. Specifically, while the mirror 31 is in its lower position (FIG. 6) the switch 51 is closed and the switch 52 is open as shown in FIG. 4. Now, when a command is given to move the mirror 31 to its upper position, the motor 46 is energized by current drawn through the switch 51. Hence, the shaft 44 rotates in the direction of the arrow, thereby causing the finger-like projection 47 to swing the arm 36 upwardly against the bias supplied by the springs 41. Approximately 180° of rotation brings the leading edge 57 of the enlarged radium segment 56 of the camming surface 55 into engagement with the actuator 53 for the switch 51, with the result that the motor 46 is then de-energized to bring the mirror 31 to reset in its upper position (FIG. 7). Even before the switch 51 is opened, the trailing edge 58 of the enlarged radius segment 56 clears the actuator 54 for the switch 52. Accordingly, when a command is given to return the mirror 31 to its lower position, the switch 52 provides a path for current flow to the motor 46. Such a command, therefore, causes the shaft 44 to be rotated through another 180° or so until the leading edge 57 of the enlarged radius segment 56 re-engages the actuator 54 for the switch 52, but this time the arm 36 swings downwardly under the urging of the bias springs 40 and 41. Because the arcuate span of the enlarged radius segment 56 of the profiled surface 55 is less than 180°, one or the other of the switches 51 and 52 is always closed. Hence, there is a substantial degree of failsafe protection.

In keeping with one of the specific aspects of this invention, means are provided for precisely and repeatedly locating the mirror 31 when it is moved to its lower position. To that end, as shown, there is a set screw 59 threaded through the arm 36 and extending toward the bracket 39. As best shown in FIG. 6, the set screw 59 limits the downward swinging of the arm 36. More particularly, when the mirror 31 is being returned to its lower position, the tip of the set screw 59 bottoms against the bracket 59 to halt the downward travel of the arm 36 at a predetermined point. At that time, the leading edge 57 of the enlarged radius camming segment 56 is still short of the switch actuator 54. Thus, the shaft 44 continues to rotate after the downward travel of the arm 36 has been halted and until the leading edge 57 of the camming segment 56 engages the switch actuator 54, thereby disengaging the lifter 47 from the arm 36. This ensures that the light that impinges on the mirror 31 when it is in its lower position is reflected therefrom in a predetermined plane.

What is claimed is:

1. In an apparatus having a laser for supplying a beam of collimated light, a deflecting means for cyclically sweeping said beam through a predetermined scan angle, and spaced apart line-like scanning and printing stations; an optical system comprising the combination of a mirror supported by a pivotally mounted arm, and drive means coupled to said mirror for selectively positioning said mirror to alternatively intercept and pass said cyclically sweeping light beam; said drive means including bias means coupled to said arm for urging said mirror towards a predetermined beam intercepting position, motor means, cam means engaging said arm and coupled to be driven by said motor means, and control means coupled to said motor for selectively energizing and deenergizing said motor, whereby said cam means is driven to selectively move said mirror between said beam intercepting position and another position selected to preclude said mirror from intercepting said beam, said cyclically sweeping light beam being directed to one of said stations via a first optical path when intercepted by said mirror and to the other of said stations via a second optical path when passed by said mirror, whereby said apparatus is alternatively conditioned for laser scanning and laser printing and utilizes the same laser and the same deflecting means for scanning and printing.

2. The apparatus of claim 1 wherein said drive means further includes means for precisely and repeatedly locating said mirror when the mirror is moved into said beam intercepting position.

3. The apparatus of claim 1 wherein said first and second optical paths are of substantially equal length, thereby providing substantially equal light spot sizes and scan line lengths for scanning and printing.

4. The apparatus of claim 3 wherein said deflecting means sweeps said beam through said scan angle in a first predetermined plane, and said drive means further includes stop means for precisely and repeatedly locating said mirror when the mirror is moved into said beam intercepting position, whereby the scanning beam continues in said first plane past said mirror when said mirror is in said other position and is redirected in a second predetermined plane when said mirror is positioned in said beam intercepting position.

5. In an apparatus having means for supplying a beam of collimated light along a given path, first deflecting means located in said path to receive said beam thereon and for cyclically sweeping said beam through a predetermined scan angle, spaced apart line-like scanning and printing stations, said first deflecting means being optically located between said stations and said beam supplying means, one of said stations being located in the normal path of said cyclically sweeping beam and the other of said stations being located out of the normal path of said cyclically sweeping beam, second deflecting means optically located between said stations and said first deflecting means, means for moving said second deflecting means into a deflecting position in the normal path of said cyclically sweeping beam to intercept said sweeping beam and deflect the same to the other of said stations and for moving the same out of said deflecting position to a beam passing position to allow said sweeping beam to reach said one station, whereby said apparatus is conditioned for either scanning or printing.

6. The apparatus of claim 5 wherein the optical paths to each station are of substantial equal length, whereby the scanning and printing are selectively carried out with substantially equal size spots of scanning light cyclically sweeping along scan lines of substantially equal length.

7. The apparatus of claim 5 wherein said second deflecting means is a pivotal mirror, a cam having a cam surface, a cam follower engaging said surface and operatively connected to said mirror, means urging said mirror in one pivotal direction, said cam surface having one portion so constructed to move said cam follower and thereby said mirror against said urging means in the opposite pivotal direction to one of said positions, and another portion so constructed to allow said urging means to pivot said mirror in said one direction to the other of said positions.

8. The apparatus of claim 5 wherein said beam supplying means is a laser and said second deflecting means is a mirror.

9. The apparatus of claim 8 wherein the optical paths of each station are of substantial equal length, whereby the scanning and printing are selectively carried out with substantially equal size spots of scanning light cyclically sweeping along scan lines of substantially equal length.

* * * * *

UNITED STATES PATENT OFFICE
CERTIFICATE OF CORRECTION

Patent No. 3,870,816 Dated March 11, 1975

Inventor(s) Peter John Mason

It is certified that error appears in the above-identified patent and that said Letters Patent are hereby corrected as shown below:

Column 4, line 39, after "is" insert --a cam-- and after "42" delete "cam 41".

Column 4, line 42, delete "given" and substitute therefor --driven--.

Signed and sealed this 20th day of May 1975.

(SEAL)
Attest:

RUTH C. MASON
Attesting Officer

C. MARSHALL DANN
Commissioner of Patents and Trademarks